Patented Sept. 6, 1932

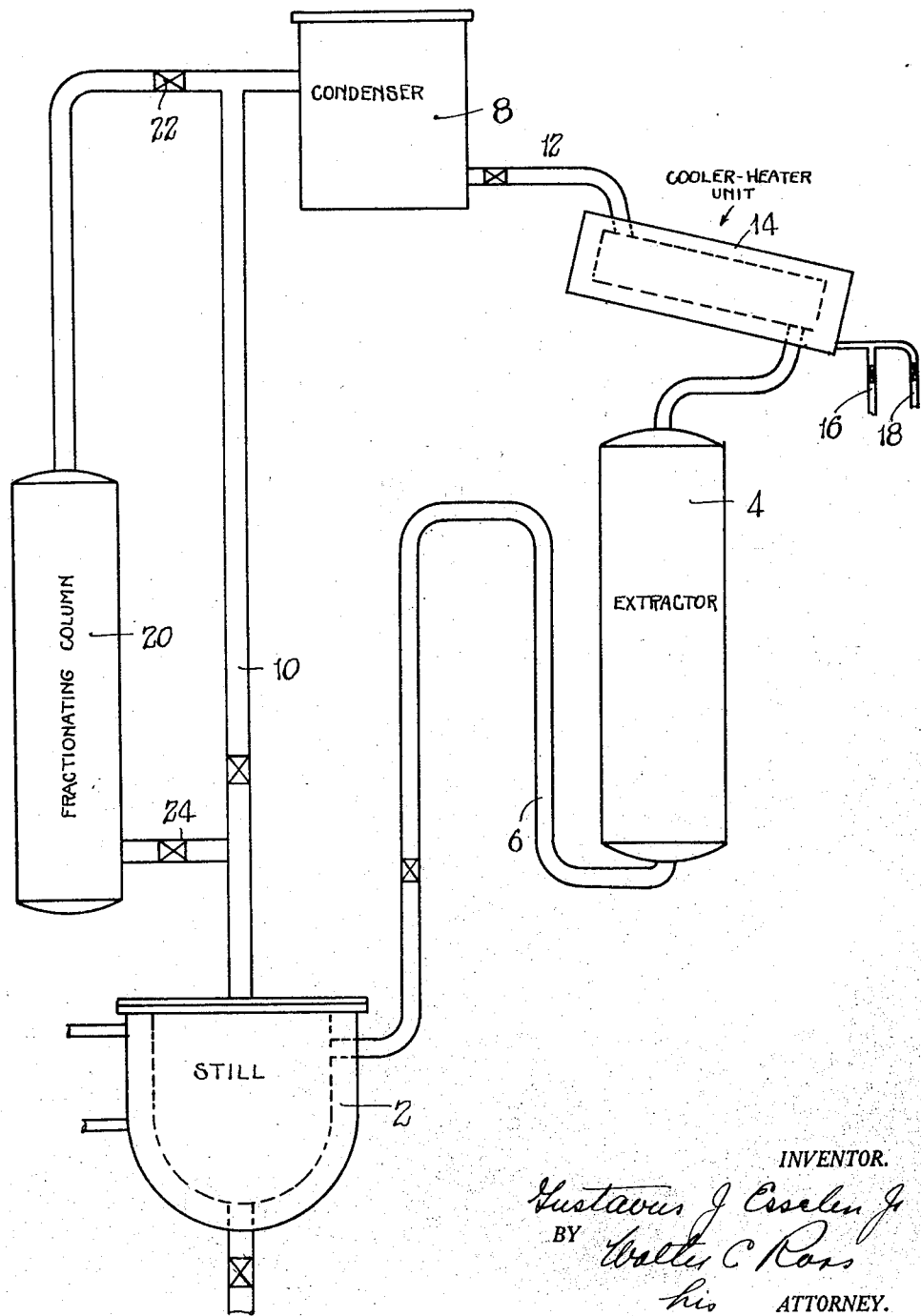

1,875,731

UNITED STATES PATENT OFFICE

GUSTAVUS J. ESSELEN, JR., OF SWAMPSCOTT, MASSACHUSETTS, ASSIGNOR TO THE FIBERLOID CORPORATION, OF INDIAN ORCHARD, MASSACHUSETTS, A CORPORATION OF MASSACHUSETTS

PROCESS FOR RECOVERY OF CAMPHOR

Application filed July 12, 1929. Serial No. 377,853.

This invention relates to improvements in the method of separating the ingredients of compositions such as pyroxylin plastic and the like and the application is a continuation in part of an application Ser. No. 331,162, filed by me on January 8, 1929.

The application referred to describes how celluloid composition is formed into a mass of units of more or less uniform size and is then subjected to the action of a separating agent in the form of a liquid which functions to take up or absorb one of the principal constituents of the celluloid and thereby extracts and separates the same from another constituent or constituents.

It has been discovered according to this invention that the camphor and pyroxylin of pyroxylin plastic compositions may be separated in an economical and efficient manner when a separating liquid is used at certain temperatures and comprises a mixture of substances. That is by operating within a convenient and easily attainable range of temperatures a liquid may be used which consists of a mixture of certain substances. The substances to be selected and the relative proportions thereof are such that the liquid is adapted for the purpose when used at temperatures within the range and in that way it is possible to effect the desired efficiency and economy of operation.

Accordingly therefore the principal object of this invention is the provision of a process of the class referred to wherein a separating liquid comprising a mixture of certain substances is contacted with the pyroxylin plastic composition by being circulated therethrough or thereover either continuously or intermittently. The liquid when contacted with the composition is in an essentially camphor-free condition so as to readily absorb or extract camphor and its temperature is maintained within a working range to facilitate the maximum of camphor extraction.

The novel features of the process of the invention may be carried out by means of various forms of suitably adapted apparatus but for purposes of disclosure will be described in connection with the apparatus diagrammatically shown in the accompanying drawing wherein:

The figure is a diagrammatic view showing one form of apparatus for carrying out the method of the invention.

The apparatus shown in the drawing comprises the following:

A still or kettle is represented at 2 which has an inner compartment or receptacle and an outer surrounding compartment such as a jacket so that material in the still may be heated for carrying out the invention. An extractor 4 in the form of a closed container for holding composition such as pyroxylin plastic, the ingredients of which are to be separated, has its lower end connected by a pipe 6 to the still 2, as shown. This is arranged in such a way that the liquid does not flow from the extractor 4 until it is filled with liquid. When filled, a siphon action starts so that the liquid all flows out and this action may be repeated as many times or as often as is desired.

A condenser unit 8 of usual form is adapted to receive vapors from the still through a pipe 10 and is arranged to deliver condensate through a pipe 12 to a temperature control unit 14 which in turn has its outlet connected to the extractor 4. The unit 14 may receive either a cooling or heating medium through pipes 16 and 18 and is adapted to cool or heat and thereby control or regulate the temperature of the condensate as it passes therethrough into the extractor. This unit will adjust the temperature of the separating liquid as is desirable in connection with the practice of the invention.

A fractionating column 20 of usual form is arranged to receive separating liquid from the still for certain purposes later to be described. This is connected between the still and condenser and valves 22 and 24 are provided as shown so as to isolate this unit from the same when desired.

According to the mode of operation of the invention a separating liquid mixture is placed in the still and pyroxylin plastic is placed in the extractor. The liquid is heated in the still so that the vapors thereof pass upwardly to the condenser where a condensing action takes place and the condensed liquid flows through the unit 14 into and through the extractor as previously described and back into the still. In this way the liquid is repeatedly contacted with the pyroxylin plastic so as to absorb or extract the camphor constituent thereof and carry it to the still. By the heating action in the still the liquid passes upwardly therefrom as vapor, leaving the camphor in the still, thus separating the liquid and camphor. The mode of operation thus described insures that substantially camphor-free liquid is being continually brought into contact with the pyroxylin plastic. This is desirable because the liquid is thereby suited for its camphor extracting function to separate the camphor and pyroxylin.

One of the novel features of this invention is the discovery that the rate of extraction of the camphor from pyroxylin plastic materials can be materially facilitated if there is added to the extracting liquid a certain amount of a pyroxylin solvent. In other applications of mine it has been disclosed that camphor may be removed from pyroxylin plastic compositions by treatment with a liquid which is a solvent for the camphor but is a non-solvent for the pyroxylin. I have now discovered that the rate of extraction of camphor is materially increased if there be added to the liquid which is a non-solvent for pyroxylin, a certain proportion of a solvent which is a solvent for the pyroxylin. This seems to result in a more ready penetration of the pyroxylin plastic by the extracting liquid and to facilitate the extraction of the camphor.

The extracting operation may be conducted at any convenient temperature, but the temperature having been decided upon it is then desirable to adjust the proportions of solvent and non-solvent liquid above referred to so that there is as much of the solvent constituent present as can be used in connection with the non-solvent liquid employed without materially softening the pyroxylin plastic, which softening would have a tendency to cause the individual particles to lump or stick together and thus reduce the surface exposed to the action of the extracting medium.

In selecting the liquids to comprise this mixture of solvent and non-solvent, it is, of course, desirable to select liquids which have boiling points reasonably close together in order to avoid undue separating of these liquids in the process of distillation.

For one constituent of the mixture textile spirits may be used. This is a petroleum fraction having a reasonably narrow boiling point between that of gasoline and kerosene. It is not only a solvent of the camphor and a non-solvent of the pyroxylin so as to be adapted for the practise of the invention, but has the advantage of being relatively inexpensive. Other liquids having similar properties may of course be used.

For another constituent acetone or ethyl-acetate may be used. These are solvent of both the pyroxylin and camphor. These are mixed according to an important feature of the invention in such proportions as to provide a liquid operable within the temperature range stated to penetrate the composition and extract the camphor therefrom.

As examples, mixtures of either acetone or ethyl-acetate 5% to 35% and textile spirits between 95% and 65% by volume give satisfactory results when contacted with the composition within the temperature range from 15 degrees to 50 degrees centigrade. Specifically, in using these constituents, the proportions are preferably as follows:—textile spirits 82% and ethyl acetate 18% by volume. Textile spirits 85% and acetone 15% by volume. In either case for best results the operating temperature of the liquid is substantially 25 degrees centigrade. With these proportions and the temperature condition stated, the composition is readily permeated and the camphor absorption is at a maximum rate.

It is desirable in all cases that the temperature of the mixture be maintained at some definite value so that the liquid mixtures will operate most efficiently. Where the temperature is excessive there is likely to be a softening of the composition which causes it to lump together while when too low the rate of camphor absorption is slowed up.

As the liquid flows downwardly through the material in the extractor it is brought into contact therewith so that at the desired working temperature the rate of camphor extraction may be maintained within such limits as will bring about the most desirable results. By separating the camphor from the liquid at the still in each cycle of operation the pyroxylin plastic is then acted upon by what may be called fresh separating liquid. As one special feature it will be observed that by repeatedly circulating the liquid through the pyroxylin plastic a continuous process results which by reason of the liquid being maintained at a predetermined working temperature and being essentially free of camphor will function in the most efficient manner.

As the proportion of camphor in the still gradually increases there is an increasing tendency for some of it to volatilize with the separating liquid. If means were not taken to prevent this, it would obviously slow down the extraction action of the liquid. Provision is therefore made for passing vapor from the still through a fractionating column where the liquid and camphor are separated from one another. In this way the liquid leaving the condenser may be kept in an essentially camphor-free condition and the camphor is automatically returned to the still.

Various forms of apparatus may be employed for circulating the fresh separating liquid through the pyroxylin plastic and at a temperature within the desired range to bring about the desired separating of the pyroxylin and camphor without departing from the spirit and scope of the invention.

Having thus described the invention, what I now claim and desire to secure by Letters Patent of the United States is:

1. The method of separating the camphor and pyroxylin of pieces of pyroxylin plastic composition which consists in, circulating a liquid over and through the composition and maintaining the liquid within a temperature range from 15 to 40 degrees centigrade, the said liquid consisting of a mixture of textile spirits and a relatively small amount of a pyroxylin solvent.

2. The method of separating the camphor and pyroxylin of pyroxylin plastic composition which consists in, subjecting the composition to the action of a liquid by circulating the liquid over and through the composition, the said liquid consisting of a mixture of acetone and textile spirits in the proportion of from 5 to 35% and 60% to 95% by volume respectively, in maintaining the temperature of the liquid between 15 and 40 degrees centigrade for contacting with the composition and finally in distilling said camphor containing liquid to separate the camphor therefrom.

3. The method of separating the camphor and pyroxylin of pieces of pyroxylin plastic composition which consists in, subjecting the composition to the action of a liquid by circulating the liquid over and through the composition and in maintaining the temperature of the liquid within a range from 15 to 40 degrees centigrade, the said liquid consisting of a mixture of ethyl acetate and textile spirits in the proportion of 5 to 35% and 60 to 95% by volume respectively, and finally in separating the camphor from the liquid.

4. The method of extracting camphor from pieces of pyroxylin plastic composition which consists in, subjecting the composition to the action of a liquid by circulating the liquid over and through the composition, the said liquid consisting of a mixture of ethyl acetate and textile spirits in the proportion of 18% and 82% respectively by volume, maintaining the temperature of the liquid between 15 and 40 degrees centigrade for contacting with the composition and finally in distilling said liquid to separate the camphor therefrom.

5. The method of separating the camphor and pyroxylin of pyroxylin plastic composition which consists in, subjecting the composition to the action of a liquid by circulating the liquid over and through the composition, the said liquid consisting of a mixture of acetone and textile spirits in the proportion of 15% and 85% respectively by volume, maintaining the temperature of the liquid between 15 and 40 degrees centigrade for contacting with the composition and finally in distilling said liquid to separate the camphor therefrom.

In testimony whereof I affix my signature.

GUSTAVUS J. ESSELEN, JR.